United States Patent [19]

Shryne et al.

[11] 3,984,388

[45] Oct. 5, 1976

[54] PROCESS TO PREPARE POLYKETONES

[75] Inventors: Thomas Michael Shryne, Houston, Tex.; Howard V. Holler, Oakland, Calif.

[73] Assignee: Shell Oil Company, Houston, Tex.

[22] Filed: June 2, 1975

[21] Appl. No.: 582,949

[52] U.S. Cl. .................. 260/63 CQ; 260/63 R; 526/11.1
[51] Int. Cl.[2].............. C08F 110/02; C08F 110/10; C08G 2/00; C08G 4/00
[58] Field of Search...... 260/63 CQ, 94.9 B, 88.1 R, 260/88.2 R, , 93.7, 94.8, 94.9 CA, 94.9 CB, 94.9 CC

[56] References Cited
UNITED STATES PATENTS

| | | | |
|---|---|---|---|
| 2,577,208 | 12/1951 | Reppe et al. | 260/597 R |
| 3,194,800 | 7/1965 | Blackham | 260/94.9 B |
| 3,835,123 | 9/1974 | Nozaki | 260/63 CQ |

*Primary Examiner*—Joseph L. Schofer
*Assistant Examiner*—Herbert J. Lilling

[57] ABSTRACT

Interpolymers of carbon monoxide and alpha-olefins are prepared under substantial anhydrous conditions by employing a solvent selected from the group consisting of hexafluoroisopropanol and meta-cresol and a catalyst selected from the group consisting of nickel (II) cyanide, specified tetracyanonickelate (II) salts, and mixtures thereof.

10 Claims, No Drawings

PROCESS TO PREPARE POLYKETONES

THE PRIOR ART

Interpolymers of carbon monoxide and ethylene (polyketones), as well as processes for their preparation are well known. The first polyketones were disclosed by Farbenfabriken Bayer in 1941 (German Pat. No. 863,771). Significant classes of polyketones which have been prepared include: (1) high molecular weight copolymers which are essentially polyethylene with less than 1% CO incorporated, prepared via Ziegler catalysis (British Pat. No. 925,130); (2) free radical and radiation initiated copolymers which have low molecular weight and a CO content varying up to 50% (W. G. Barb, Journal of the American Chemical Society, 75, 224 (1953), P. P. Colombo et al, Journal of Polymer Science B1, 447 (1963)); and (3) transition metal catalyzed copolymers with an apparent regular alternating-chain structure. Processes to prepare these alternating-chain structure polyketones are disclosed in Reppe et al, U.S. Pat. No. 2,577,208 [$K_2Ni(CN)_4$ catalyst], British Pat. No. 1,081,304 [$(Bu_3P)_2Pd(Cl)_2$ catalyst], and Nozaki, U.S. Pat. No. 3,835,123 [$HPd(CN)_3$ catalyst].

In Reppe et al the process to prepare the polyketones comprises reacting an olefin with carbon monoxide and water in the presence of a complex nickel cyanide catalyst. However, the polyketones formed according to the procedure disclosed in Reppe et al are not suitable as thermoplastics because the molecular weight of the polyketone is limited to less than about 4000 daltons. A new reaction system has been found that permits the production of polyketones having molecular weight in excess of 20,000 daltons.

SUMMARY OF THE INVENTION

A process for preparing high molecular weight, linear interpolymers of carbon monoxide with at least one alpha-olefin having from two to eight carbon atoms is disclosed which process comprises reacting the carbon monoxide and alpha-olefin under substantially anhydrous conditions in the presence of a solvent selected from the group consisting of hexafluoroisopropanol and meta-cresol and a catalyst selected from nickel (II) cyanide, complex nickel salts having a tetracyanonickelate (II) anion, and mixtures thereof.

DETAILED DESCRIPTION OF THE INVENTION

The present invention will be described in greater detail with reference to the preparation of interpolymers of carbon monoxide and ethylene, although it is understood that one or more other suitable ethylenically unsaturated organic compounds may be employed.

By "ethylenically unsaturated organic compounds" is meant those compounds which contain a >C=C< linkage.

Examples of suitable unsaturated compounds coming within the scope of the present invention include the monoolefins, preferably containing from about two to eight carbon atoms such as ethylene, propylene, butylene, isobutylene, and amylene; diolefins such as butadiene, isoprene, and 2-chlorobutadiene-1,3; vinylidene compounds such as vinylidene chloride; tetrafluoroethylene; vinyl halides, esters and acetals, such as vinyl acetate, vinyl chloride, vinyl chloroacetate, vinyl dimethylacetate, and vinyl trimethylacetate; vinyl ketones such as vinyl methyl ketone and vinyl ethyl ketone; vinyl compounds such as styrene, chlorostyrene and alphamethyl styrene; acrylic and methacrylic acids, esters, amides, nitriles and acid halides; and vinyl esters of unsaturated carboxylic acids such as vinyl hexenoate, vinyl crotonate, and the like.

Preferred ethylenically unsaturated compounds include the hydrocarbon monoolefins, particularly the alpha-olefins having from two to eight carbon atoms. Particularly preferred is ethylene.

Compounds prepared by the instant process have the general formula:

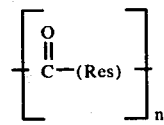

wherein Res is the residue of the copolymerizable monomer and $n$ is an integer having a value of from about 200 to 40,000. Expressed in another way, $n$ has a value commensurate with a total molecular weight of roughly $10^4$ to $2 \times 10^6$ daltons. The above alternating structure was confirmed by $^1$H-NMR measurements. The molecular weight of the resulting polymers was estimated from intrinsic viscosity measurements of polymer solutions in meta-cresol and hexafluoroisopropanol.

The term "Res" in the above formula also represents residues of different monomers in the same interpolymer when two or more comonomers are employed. Thus, if a mixture of ethylene and propylene were employed, a representative idealized structural formula would be:

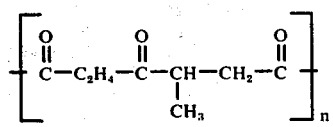

wherein $n$ has an appropriate value as noted above, e.g., a value sufficient to produce a molecular weight of $10^4$ to $2 \times 10^6$ daltons.

The preferred interpolymer is an interpolymer of carbon monoxide and ethylene having the following formula:

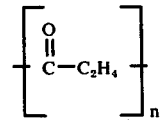

wherein $n$ has the value as noted above, and preferably from about $10^3$ to $10^4$. The interpolymers of carbon monoxide and ethylene produced according to this invention pressure sinters at about 220°C to a clear, slightly brittle film having a crystalline melting point of 250° to 260°C and is totally soluble in hexafluoroisopropanol.

The catalyst employed in the present invention consists essentially of a compound selected from the group consisting of anhydrous nickel (II) cyanide, complex nickel salts comprising a tetracyanonickelate (II) anion and a cation selected from the group consisting of $R_4N^+$, $R_4P^+$, $R_3S^+$, and $R_4As^+$ wherein R is an alkyl, aryl or cycloalkyl group of from about 3 to about 10 carbon atoms, and mixtures of said anhydrous nickel (II) cyanide and said complex nickel salt.

The anhydrous nickel (II) cyanide catalyst is a heterogeneous catalyst and typically has a planar sheet structure exemplified by the empirical formula, $[Ni(CN)_2]n$. The anhydrous nickel (II) cyanide catalyst is effective in cyclohexane, hexafluoroisopropanol, and meta-cresol solvents as discussed below. While the three compounds above are referred to as "solvents" it is to be understood that these "solvents" perform rather as diluents for the nickel (II) cyanide catalyst.

The complex nickel salt catalyst is a homogeneous catalyst and must be employed with either a hexafluoroisopropanol solvent or meta-cresol solvent to be effective. The cation of the complex nickel salt is selected to permit loose ion pairing and so that the salt is soluble in the solvent employed. Preferably the cation is the $R_4N^+$ ion. R is preferably a normal alkyl group of from about 3 to about 8 carbon atoms, e.g. a normal-butyl group or a normal-octyl group.

In general the amount of catalyst employed varies from about 0.001 percent by weight to about 5.0 percent by weight based on the total monomers charge. In most instances, it is preferred to utilize the minimum quantity of catalyst consistent with desired purity, yield and conversion. For example, as shown in Illustrative Embodiment I, the conversion efficiency, expressed in grams of polymer produced per gram of nickel introduced, increases as the catalyst concentration is reduced. Typically, the amount of catalyst required is from about 0.005 to about 1.0 percent by weight based on total monomer charge.

The polymerization of the carbon monoxide with the ethylenically unsaturated compound can be carried out in a batch, semi-continuous or continuous process wherein the solvent, catalyst, and the monomers are first charged into a suitable reaction vessel. The mixture is then generally heated either under autogeneous pressure or under superatmospheric pressure until the degree of polymerization is achieved.

The polymerization is performed in vessels constructed or lined with glass, steel, copper, aluminum, silver, stainless steel, etc.; however, stainless steel, or other inert metals are preferred.

In general, the polymerization process is performed at temperatures of from about 75° to about 150°C and at pressures from slightly above atmospheric pressure to 1,000 atmospheres. It is preferred, however, to utilize temperatures of from about 100° to about 140°C and pressures from about 10 to about 1,000 atmospheres with from 25 to 150 atmospheres pressure being especially preferred.

In general, the monomers are introduced into the reactor in a wide range of ratios. Preferably, however, it is highly desirable to use an excess of ethylene to the carbon monoxide. Thus, a very suitable mole ratio of ethylene to carbon monoxide is from about 1:1 to 30:1 with from about 4:1 to 10:1 being preferred.

Hexafluoroisopropanol and meta-cresol have been found to be superior solvents for use in the present invention. As shown in the illustrative embodiments which follow, the use of hexafluoroisopropanol as the solvent with a bis(tetranormalbutylammonium)tetracyanonickelate (II) catalyst results in the production of high molecular weight polyketones at high conversion rates. Meta-cresol also produces high molecular weight polyketones, but at a lower conversion rate as compared to hexafluoroisopropanol. Dilution of the hexafluoroisopropanol solvent with a limited amount of benzene or methylene chloride (less than 10% by volume) maintained the polyketone in solution but also reduced the conversion rate. Similarly, dilution of the hexafluoroisopropanol with acetonitrile, acetone, hexane-2,5-dione, ether, formic acid or trifluoroethanol prevented polymerization. Other media which are solvents for the catalysts as claimed here and/or the polyketone formed and which failed to permit appreciable polymerization include 2-phenylhexafluoroisopropanol, 2-methoxyhexafluoroisopropanol, hexafluoroacetone sesquihydrate, phenol, N,N-dimethylformamide, methanol, acetonitrile and acetic acid. However, where the sole catalyst employed is anhydrous nickel (II) cyanide, cyclohexane as well as hexafluoroisopropanol and meta-cresol are suitable solvents.

The amount of solvent employed should be sufficient to keep the polyketone produced in solution. Although not critical, typically the amount of solvent employed varies from about 50 to about 150 milliliters per 25 grams of copolymer produced. It is preferred that the solvent be charged to the reaction vessel first, and that the catalyst be dissolved in the solvent before charging the vessel and monomer and carbon monoxide.

It is important that the polymerization take place under substantially anhydrous conditions. For example, a green hydrous catalyst having the empirical formula $[Ni(CN)_2.1.5 H_2O]$, was found ineffective for ethylene-carbon monoxide polymerization. When this green hydrous material was converted to an anhydrous brown nickel (II) cyanide having the empirical formula $[Ni(CN)_2]n$ and was employed in the process of the present invention, a high molecular weight, equimolar alternate polyketone was formed. Trace amounts of water, exceeding 100 ppm, in the solvent inhibit polymerization. However, it has been found that the negligible amounts of water present in a para-toluenesulfonic acid monohydrate activator does not inhibit the polymerization.

It is preferred that the polymerization reaction take place in the substantial absence of oxygen since levels of oxygen of over about 100 ppm inhibit the polymerization in otherwise active systems. Therefore, typically the reaction vessel is purged with an inert gas, such as nitrogen, before being charged.

When employing as the catalyst a complex nickel salt as disclosed above, it is preferred to employ a strong acid as an activator and promoter. Examples of suitable acids include para-toluenesulfonic acid, para-phenolsulfonic acid, trifluoroacetic acid, the etherate of boron trifluoride, phosphoric acid, sulfuric acid, and mixtures thereof. Preferred strong acids are para-toluenesulfonic acid and trifluoroacetic acid. The molar ratio of strong acid per mole of complex nickel salt varies from about 1:2 to about 5:2, preferably from about 1:1 to about 2:1. Addition of strong acids to the solution containing tetracyanonickelate (II) anions tend to release HCN and precipitate $Ni(CN)_2$. Accordingly, the effective catalyst often includes both the tetracyanonickelate (II) anion and the nickel (II) cyanide, plus perhaps, some soluble intermediate species. Further, purging the reactor to remove the HCN released is desirable since HCN inhibits the polymerization.

The polyketone is recovered from the reaction mixture in any suitable manner. Since the solvent employed is more volatile than the polyketone, one suitable method to recover the polyketone is to distill the solvent-polyketone mixture and recover the polyketone as the bottoms product. Another suitable method of recovering the polyketone is to add sufficient water to the solvent-polyketone mixture so as to precipitate the polyketone. The precipitated polyketone is then recovered by suitable methods such as centrifugation or filtration.

The invention is further illustrated by means of the following Illustrative Embodiments. Note that the embodiments are given for the purpose of illustration only and that the invention is not to be regarded as limited to any of the specific conditions or reactants recited therein.

a $^1$H-nuclear magnetic resonance analysis ($^1$H-NMR). In all runs the polymer could be pressed to films at 190° to 200°C, which films were strong and flexible, also indicating a high molecular weight polymer.

TABLE I

| Run No. | Catalyst (millimoles) | Acid (millimoles) | | Reaction Conditions | | (grams Conversion (grams) | Efficiency polymer per gram nickel) |
|---|---|---|---|---|---|---|---|
| | | | | Time (hours) | Temperature (°C) | | |
| 1 | 2.0 | none | | 21 | 140 | 3.26 | 27 |
| 2 | 2.0 | none | | 18 | 140 | 2.77 | 24 |
| 3 | 2.0 | CF$_3$CO$_2$H, | 2.0 | 19 | 140 | 5.86 | 50 |
| 4 | 1.0 | CF$_3$CO$_2$H, | 1.0 | 22 | 140 | 3.94 | 68 |
| 5 | 0.50 | p-TSA-H$_2$O, | 0.25 | 20 | 140 | 4.7 | 162 |
| 6 | 0.25 | p-TSA-H$_2$O, | 0.25 | 20 | 140 | 3.0 | 214 |
| 7 | 0.10 | p-TSA-H$_2$O, | 0.10 | 18 | 140 | 3.0 | 510 |
| 8 | 0.10 | p-TSA-H$_2$O, | 0.10 | 66 | 125 | 5.3 | 903 |
| 9 | 0.05 | p-TSA-H$_2$O, | 0.05 | 18 | 140 | 2.2 | 760 |
| 10 | 0.05 | p-TSA-H$_2$O, | 0.05 | 66 | 125 | 3.35 | 1140 |
| 11 | 0.05 | p-TSA-H$_2$O, | 0.05 | 66 | 115 | 3.8 | 1300 |
| 12 | 0.10 | BF$_3$-Et$_2$O, | 0.10 | 18 | 140 | 2.95 | 500 |
| 13 | 0.10 | BF$_3$-Et$_2$O, | 0.20 | 18 | 140 | 1.55 | 260 |

ILLUSTRATIVE EMBODIMENT I

In Illustrative Embodiment I the catalyst employed was a bis(tetranormalbutylammonium)tetracyanonickelate (II) salt. The polymerization reaction was conducted in a magneticially stirred 316 stainless steel autoclave equipped with a 70 milliliter (ml) glass liner. The reaction was carried out by loading the solid catalyst, flushing the reaction vessel with nitrogen, adding 33 ml of hexafluoroisopropanol and then pressuring the vessel to about 70 atmospheres pressure with a mixture of ethylene and carbon monoxide in a molar ratio of ethylene to carbon monoxide of about 4 to 1 before heating to reaction temperature. The catalyst concentration, reaction time, and reaction temperature were varied as indicated in Table I. Runs 1 and 2 were conducted without the addition of a strong acid. In runs 3 and 4 trifluoroacetic acid was employed whereas in runs 5 through 11 para-toluenesulfonic acid monohydrate was employed and in runs 12 and 13 the etherate of boron trifluoride was employed. The results of the various runs are presented in Table I below.

In all runs, the polymer produced had a regular equimolar alternating structure and a mean average molecular weight in excess of 20,000 daltons as indicated by

ILLUSTRATIVE EMBODIMENT II

Illustrative Embodiment II was conducted in a similar manner to Illustrative Embodiment I and indicates the effect of varying the ratio of catalyst to acid promoter. In all runs the catalyst was a bis(tetranormalbutylammonium)tetracyanonickelate (II) salt and the acid was para-toluenesulfonic monohydrate. In each run, the reaction was conducted at 140°C for 18 hours. The results are presented below in Table II.

TABLE II

| Run No. | Catalyst (millimoles) | Acid (millimoles) | Conversion (grams) | Efficiency (grams polymer per gram nickel) | Molar Ratio of catalyst to acid |
|---|---|---|---|---|---|
| 14 | 0.10 | 0.05 | 1.35 | 230 | 2/1 |
| 15 | 0.10 | 0.10 | 3.0 | 510 | 1/1 |
| 16 | 0.10 | 0.20 | 3.5 | 600 | 1/2 |
| 17 | 0.10 | 0.30 | trace | — | 1/3 |
| 18 | 0.10 | 0.40 | negligible | — | 1/4 |

ILLUSTRATIVE EMBODIMENT III

Illustrative Embodiment III was conducted in a manner similar to that employed in Illustrative Embodiment I and indicates the effect of varying the reaction temperature. In all runs 0.10 millimoles of a bis(tetranormalbutylammonium)tetracyanonickelate (II) salt and 0.10 millimoles of para-toluenesulfonic acid monohydrate were employed. The reaction was conducted for 18 hours. The results are presented below in Table III.

TABLE III

| Run Number | Reaction Temperature °C | Conversion (grams) | Efficiency (grams polymer per gram nickel) |
|---|---|---|---|
| 19 | 150 | 2.1 | 360 |
| 20 | 140 | 3.0 | 510 |
| 21 | 130 | 2.4 | 410 |
| 22 | 120 | 2.7 | 460 |

ILLUSTRATIVE EMBODIMENT IV

Illustrative Embodiment IV reveals the use of anhydrous Ni(CN)$_2$ as the catalyst. In run 23, 0.22 grams of brown, anhydrous Ni(CN)$_2$ was loaded into a magnetically stirred 316 stainless steel autoclave equipped with a 70 milliliter glass liner. After loading the catalyst, the vessel was flushed with nitrogen, 33 milliliters of cyclohexane added, and the vessel was pressured to about 70 atmospheres with a mixture of ethylene and carbon monoxide in a molar ratio of ethylene to carbon monoxide of about 4 to 1. The loaded reaction vessel was then heated to a temperature of 140°C. After about 23 hours, 0.99 grams of polymer were recovered. The polymer was totally soluble in hexafluoroisopropanol and was pressed to a stong, flexible, clear film at 190° to 200°C. A $^1$H-NMR analysis indicated a regular, alternating copolymer of ethylene and carbon monoxide having a molecular weight of over 20,000 daltons.

Run 24 was conducted in an identical manner to run 23 except that the solvent employed was hexafluoroisopropanol instead of cyclohexane and the reaction was stopped after 17 hours instead of 23 hours. At the end of the 17 hours, 2.40 grams of polymer was recovered. The polymer had similar physical characteristics to that produced in run 23.

We claim as our invention:

1. A process for preparing high molecular weight, linear interpolymers of carbon monoxide with at least one alpha-olefin having from two to eight carbon atoms which comprises reacting under substantially anhydrous conditions carbon monoxide with from about 1 to about 30 moles of alpha-olefin per mole of carbon monoxide at a temperature from about 75°C to about 150°C and a pressure of from about 10 to about 1,000 atmospheres in the presence of a solvent selected from the group consisting of hexafluoroisopropanol and meta-cresol and in the presence of from about 0.005 to about 50% by weight based on monomer charged of catalyst consisting essentially of a compound selected from the group consisting of anhydrous nickel (II) cyanide, complex nickel salts comprising a tetracyanonickelate (II) anion and a cation selected from the group consisting of $R_4N^+$, $R_4P^+$, $R_3S^+$ and $R_4As^+$ wherein R is an alkyl, aryl or cycloalkyl group of from about 3 to about 10 carbon atoms, and mixtures of said anhydrous nickel (II) cyanide and said complex nickel salt.

2. A process according to claim 1 wherein said alpha-olefin is ethylene.

3. A process according to claim 2 wherein said catalyst is a complex nickel salt and wherein the solvent is hexafluoroisopropanol.

4. A process according to claim 3 wherein the cation of the complex nickel salt is a tetranormalbutylammonium group.

5. A process according to claim 3 wherein between about 0.5 and about 2.5 moles of a strong acid per mole of complex nickel salt is employed with said complex nickel salt and wherein the strong acid is selected from the group consisting of para-toluenesulfonic acid, para-phenolsulfonic acid, trifluoroacetic acid, the etherate of boron trifluoride, phosphoric acid, and sulfuric acid.

6. A process according to claim 4 wherein between about 1.0 and about 2.0 moles of a strong acid per mole of complex nickel salt is employed and wherein the strong acid is selected from the group consisting of para-toluenesulfonic acid and trifluoroacetic acid.

7. A process according to claim 2 wherein 1 mole of carbon monoxide is reacted with from about 4 to about 10 moles of ethylene at about 100° to about 140°C and about 25 to about 150 atmospheres pressure.

8. A process according to claim 2 wherein the interpolymer formed has a regular alternating-chain structure.

9. A process for preparing high molecular weight, linear interpolymers of carbon monoxide with at least one alpha-olefin having from two to eight carbon atoms which comprises reacting under substantially anhydrous conditions carbon monoxide with from about 1 to about 30 moles of alpha-olefin per mole of carbon monoxide at about 75° to about 150°C and about 10 to about 1,000 atmospheres pressure in the presence of a solvent selected from the group consisting of hexafluoroisopropanol, meta-cresol, and cyclohexane and in the presence of from about 0.005 to about 50% by weight based on monomer charged of catalyst consisting essentially of anhydrous nickel (II) cyanide.

10. A process according to claim 9 wherein the alpha-olefin is ethylene.

* * * * *